(12) United States Patent
Wang

(10) Patent No.: US 6,350,842 B1
(45) Date of Patent: Feb. 26, 2002

(54) PREPARATION OF ALLYLIC COPOLYMERS OF BROAD MOLECULAR WEIGHT DISTRIBUTIONS

(75) Inventor: Wei Wang, Boothwyn, PA (US)

(73) Assignee: ARCO Chemical Technology, L.P., Greenville, DE (US)

( * ) Notice: Subject to any disclaimer, the term of this patent is extended or adjusted under 35 U.S.C. 154(b) by 0 days.

(21) Appl. No.: 09/970,321

(22) Filed: Oct. 3, 2001

Related U.S. Application Data

(62) Division of application No. 09/432,977, filed on Nov. 3, 1999.

(51) Int. Cl.$^7$ .............................................. C08F 220/12
(52) U.S. Cl. .................... 526/329.6; 526/319; 526/328; 526/328.5; 526/329; 526/329.1; 526/329.2; 526/332; 526/335; 526/336; 526/337; 526/340; 526/347; 526/348
(58) Field of Search ................................. 526/319, 328, 526/328.5, 329, 329.1, 329.2, 329.6, 332, 335, 336, 337, 340, 347, 348

(56) References Cited

U.S. PATENT DOCUMENTS

| | | | | |
|---|---|---|---|---|
| 4,243,768 A | * | 1/1981 | Simpson | 525/127 |
| 4,833,223 A | * | 5/1989 | Myers | 526/301 |
| 5,204,422 A | * | 4/1993 | Seltzer et al. | 526/204 |
| 5,219,947 A | | 6/1993 | Yasuda et al. | 525/309 |
| 5,382,642 A | | 1/1995 | Guo | 526/333 |
| 5,451,652 A | | 9/1995 | Guo et al. | 526/333 |
| 5,475,073 A | | 12/1995 | Guo | 526/333 |
| 5,480,954 A | | 1/1996 | Guo | 526/330 |
| 5,646,225 A | | 7/1997 | Guo | 526/318.5 |
| 5,866,712 A | * | 2/1999 | Sanchez et al. | 560/170 |
| 6,103,840 A | * | 8/2000 | Guo | 526/73 |

* cited by examiner

Primary Examiner—Helen L. Pezzuto
(74) Attorney, Agent, or Firm—Shao Guo

(57) ABSTRACT

A process for making an allylic copolymer is disclosed. The process is a free radical copolymerization of a mono-ethylenic monomer, a multi-ethylenic monomer, and a mono-allylic monomer. The copolymer produced has a high molecular weight and a broad molecular weight distribution, and it is particularly useful as a toner resin.

9 Claims, No Drawings

PREPARATION OF ALLYLIC COPOLYMERS OF BROAD MOLECULAR WEIGHT DISTRIBUTIONS

This is a division of application Ser. No. 09/432,977, filed Nov. 3, 1999 now allowed.

FIELD OF THE INVENTION

The invention relates to allylic copolymers. More particularly, the invention relates to allylic copolymers that have broad molecular weight distributions. The copolymers are particularly useful, for example, as toner resins.

BACKGROUND OF THE INVENTION

Allyl alcohol and allyl alcohol alkoxylates are useful, unique, hydroxyl functional monomers. They readily copolymerize with most commonly used monomers, e.g., vinyl aromatics, acrylates and methacrylates, vinyl ethers and esters, vinyl halides, conjugated dienes, and many others. These allylic monomers not only contribute hydroxyl functionality to the copolymers, but they also regulate the molecular weight of the copolymers and control the polymerization rate. When even a small portion of allylic monomer is used, a low molecular weight polymer is produced.

U.S. Pat. No. 5,382,642 teaches how to prepare copolymers of vinyl aromatics and allyl alcohol propoxylates. The copolymers have hydroxyl numbers of 80–260 mg KOH/g, and number average molecular weights from 500 to 3500. They are particularly useful for polyurethane, alkyd, and melamine coatings.

U.S. Pat. No. 5,451,652 teaches how to prepare homopolymers of allyl alcohol propoxylates, and copolymers of allyl alcohol and allyl alcohol propoxylates. These polymers are highly hydroxyl-functionalized, and are particularly useful as crosslinking agents.

U.S. Pat. No. 5,475,073 teaches how to prepare hydroxyl acrylic resins by substituting allyl alcohol and allyl alcohol propoxylates for hydroxyalkyl acrylates or methacrylates. By using the allylic monomers, low molecular weight resins are advantageously produced without the need for a chain transfer agent or solvent. The resins have hydroxyl numbers from 50 to 450 mg KOH/g, and number average molecular weights from 500 to 10,000. They are particularly useful for acrylicurethane and acrylic-melamine coatings.

U.S. Pat. No. 5,480,954 teaches how to prepare copolymers of allyl esters with allyl alcohol or allyl alcohol propoxylates. Compared with the polymers taught in U.S. Pat. No. 5,451,652, these copolymers have lower hydroxyl numbers, improved solubility in organic solvents, and better compatibility with other resins.

U.S. Pat. No. 5,646,225 teaches how to prepare water-soluble or water-dispersible resins. These resins are prepared by copolymerizing an allyl alcohol propoxylate, a vinyl aromatic monomer, and acrylic acid. They are particularly useful in water-borne coatings and inks.

The polymers disclosed in the above U.S. patents all have low molecular weights and narrow molecular weight distributions. They are highly valuable as hydroxyl functional resins in high-solids or low-VOC coatings because their low molecular weights and narrow molecular weight distributions give low solution viscosities.

Allylic copolymers having high molecular weights and broad molecular weight distributions are needed, for example, in toner resins. However, they are difficult to prepare.

Commonly used toner resins are high molecular weight copolymers of styrene and butadiene, or styrene and acrylates. Usually, they are prepared by suspension or emulsion polymerization. Toner resins usually require broad molecular weight distributions or bimodal distributions because the low molecular weight portion gives the toner low melt viscosity and good flexibility, while the high molecular weight portion improves anti-offset and anti-winding characteristics.

U.S. Pat. No. 5,219,947 teaches how to prepare a toner resin by a two-stage polymerization process. In the first stage, a low molecular weight polymer is formed in a solution polymerization. In the second stage, the low molecular weight polymer from the first stage is dissolved in a monomer, and the monomer is then polymerized by a suspension polymerization. The preparation is rather complicated not only because there are two different polymerization processes involved, but also because both the organic solvent from the first stage and water from the second stage must be removed from the product.

Copending application Ser. No. 09/085,039 teaches how to prepare high molecular weight, broad molecular weight distribution, allylic copolymers. These copolymers are particularly useful as toner resins. They are prepared by copolymerizing an ethylenic monomer, a monofunctional allyl monomer, and a multifunctional allyl monomer. No solvent is needed in the preparation. However, removing the unreacted multifunctional allyl monomer, such as diallyl phthalate, is found to be very difficult.

New methods for preparing allylic copolymers of high molecular weight and broad molecular weight distribution are needed. Ideally, the preparation does not require the use of a multifunctional allylic monomer.

SUMMARY OF THE INVENTION

The invention is a process for preparing an allylic copolymer that has a broad molecular weight distribution. The process comprises free radically copolymerizing a mixture of a mono-ethylenic monomer, a multi-ethylenic monomer, and a mono-allylic monomer to produce an allylic copolymer that has a high molecular weight, a broad molecular weight distribution, and a low gel content.

The invention includes an allylic copolymer that comprises about 0.1% by weight to about 10% by weight of multi-ethylenic monomeric units, about 5% by weight to about 40% by weight of mono-allylic monomeric units, and about 50% by weight to about 95% by weight of mono-ethylenic monomeric units. The polymer has a weight average molecular weight greater than about 10,000, a molecular weight distribution (Mw/Mn) greater than about 5, and a gel content less than about 10% by weight. It is particularly useful as a toner resin.

DETAILED DESCRIPTION OF THE INVENTION

The process of the invention comprises free radically copolymerizing a monomer mixture containing: a) a mono-ethylenic monomer; b) a multi-ethylenic monomer; and c) a mono-allylic monomer.

The mono-ethylenic monomer suitable for use in the invention has one free radically polymerizable group. Preferably, the group is —CR=CH$_2$, wherein R is hydrogen, or C$_1$ to C$_{10}$ alkyl. Examples of suitable mono-ethylenic monomers are vinyl aromatics, vinyl halides, vinyl ethers, vinyl esters, unsaturated nitrites, acrylic and methacrylic acids and their esters, conjugated dienes, and the like, and mixtures thereof. Preferred monoethylenic monomers are vinyl aromatics, $C_1$ to $C_{10}$ alkyl acylates and methacrylates, and conjugated dienes. Particularly preferred are styrene, methyl methacrylate, butyl methacrylate, butyl acrylate, isoprene, and butadiene. More preferred are mixtures of styrene with butyl acrylate, and styrene with butadiene.

Usually, the mono-ethylenic monomer is the major component of the monomer mixture. The amount used is determined by many factors, particularly the desired glass transition temperature ($T_g$) of the copolymer. For toner applications, the copolymer is required to have a $T_g$ greater than about 50° C. The $T_g$ of the copolymer is essentially determined by the monomeric type and comonomer ratio. For example, when a low $T_g$ mono-allylic monomer is used, a relatively large amount of a high $T_g$ mono-ethylenic monomer is required to achieve a high $T_g$ copolymer. The mono-ethylenic monomer is usually used in an amount greater than about 50% by weight of the copolymer composition.

The multi-ethylenic monomer suitable for use in the invention contains more than one free radically polymerizable ethylenic group as defined above. Examples are divinyl aromatics, diacrylates, and dimethacrylates. Preferred multi-ethylenic monomers are divinyl benzene (DVB), and ethylene glycol dimethacrylate.

The amount of multi-ethylenic monomer used is important because it determines the molecular weight of the copolymer. The multi-ethylenic monomer has two or more reactive carbon-carbon double bonds that participate in the polymerization. This results in polymeric chain branching and an increase in copolymer molecular weight. Using too much multi-ethylenic monomer causes gel formation during polymerization. Gel formation is undesirable because it causes difficulty in product isolation and reactor cleaning-up. Moreover, the highly crosslinked copolymer is less desirable in toner applications.

It is essential to use the multi-ethylenic monomer in the presence of a mono-allylic monomer. Without a mono-allylic monomer, using the multi-ethylenic monomer causes gel formation.

The amount of the multi-ethylenic monomer used depends on the amount of mono-allylic monomer used. The multi-ethylenic monomer is usually used in an amount less than 15% by weight of the copolymer composition. More preferably, it is used in an amount less than 10% by weight of the copolymer composition.

Mono-allylic monomers suitable for use in the invention contain a single allylic double bond. Suitable mono-allylic monomers include allylic alcohols, alkoxylated allylic alcohols, allyl ethers, allyl esters, allyl amines, allyl carbonates, and the like, and mixtures thereof. Examples of allylic alcohols are allyl alcohol, methallyl alcohol, and 2-ethyl-2-propen-1-ol. Allyl alcohol is preferred because it is commercially available.

Alkoxylated allylic alcohols suitable for use in the invention include alkoxylation products of allyl alcohol and methallyl alcohol with ethylene oxide, propylene oxide, and the like, and mixtures thereof. Preferred alkoxylated allylic alcohols have less than 10 units of oxyalkylene. Preferred alkoxylated allylic alcohols include allyl alcohol monopropoxylate and allyl alcohol monoethoxylate because they have relatively low boiling points and easier to remove from the copolymer product after polymerization.

Preferred allyl ethers include $C_1$–$C_{10}$ alkyl and aryl allyl ethers and methallyl ethers. Examples of suitable allyl ethers are allyl methyl ether, methallyl methyl ether, allyl ethyl ether, allyl t-butyl ether, and the like, and mixtures thereof.

Preferred allyl esters include allyl esters and methallyl esters of $C_1$–$C_{12}$ aliphatic or aromatic acids. Examples of suitable allyl esters are allyl acetate, methallyl acetate, allyl butyrate, allyl formate, allyl benzoate, and the like, and mixtures thereof.

Preferred allyl amines include allyl amine, methallyl amine, $C_1$–$C_{12}$ alkyl or aryl N-substituted allyl amines or methallyl amines, and the like, and mixtures thereof. Examples of suitable allyl amines are allyl amine, methallyl amine, N-methyl allyl amine, N-butyl allyl amine, N-benzyl allyl amine, N,N-dimethyl allyl amine, N,N-dibutyl methallyl amine, and the like, and mixtures thereof.

Preferred allyl carbonates include $C_1$–$C_{12}$ alkyl and aryl allyl carbonates and methallyl carbonates. Examples of suitable allyl carbonates are methyl allyl carbonate, methyl methallyl carbonate, ethyl allyl carbonate, and the like, and mixtures thereof.

It is essential to use the mono-allylic monomer in combination with a multi-ethylenic monomer because without the multi-ethylenic monomer, the process produces only a copolymer having a low molecular weight and a narrow molecular weight distribution.

The amount of the mono-allylic monomer used depends on many factors, particularly the amount of an multi-ethylenic monomer used. The mono-allylic monomer functions as a crosslinking retardant that reduces the gel formation. Generally, when more multi-ethylenic monomer is used, more mono-allylic monomer is needed. When the multi-ethylenic monomer is used in an amount from about 0.1% to about 5% by weight, the mono-allylic monomer is preferably used in an amount from about 5% to about 25% by weight. When the multi-ethylenic monomer is used in an amount from about 5% to about 10% by weight, the mono-allylic monomer is preferably used in an amount from about 25% to about 40% by weight.

An excess of mono-allylic monomer is usually needed to incorporate a sufficient amount of it into the copolymer. The unreacted mono-allylic monomer is then removed from the copolymer after polymerization by distillation.

The process of the invention is a free-radical polymerization. Generally, the mono-allylic monomer is added into the reactor before the polymerization starts. Usually the mono-ethylenic and multi-ethylenic monomers are gradually fed during the polymerization. It is preferred to add at least about 50% by weight, preferably at least about 70% by weight, of the mono-ethylenic and the multi-ethylenic monomers to the reaction mixture gradually. Preferably, the monoethylenic and the multi-ethylenic monomers are added at rates effective to maintain their steady, low concentrations in the reaction mixture. Preferably, the ratio of mono-allylic monomer to mono-ethylenic and multi-ethylenic monomers is kept essentially constant; this helps to produce a resin having a relatively uniform composition. Gradual addition of the mono-ethylenic and the multi-ethylenic monomers enables the preparation of a copolymer having a desired molecular weight and molecular weight distribution and having a minimum amount of gel formation.

Suitable free radical initiators include peroxides, hydroperoxides, azo compounds, and many others known to the polymer industry. Examples of suitable free radical initiators are hydrogen peroxide, di-t-butyl peroxide, t-butyl hydroperoxide, cumene hydroperoxide, 2,2'-azobisisobutyronitrile, and the like, and mixtures thereof. Generally, it is preferred to add the free radical initiator to the reactor gradually during the course of the polymerization; it is also desirable to match the addition rate of the free-radical initiator to the addition rates of the mono-ethylenic and the multi-ethylenic monomers.

I surprisingly found that using a combination of a mono-allylic monomer and a multi-ethylenic monomer produces an allylic copolymer having a high molecular weight and a broad molecular weight distribution without gel formation during polymerization.

The invention also includes an allylic copolymer. The copolymer comprises a mono-ethylenic monomeric unit, a multi-ethylenic monomeric unit, and a mono-allylic monomeric unit. Suitable mono-ethylenic, multiethylenic, and mono-allylic monomers are discussed above. Preferably, the copolymer comprises about 0.1% by weight to about 10% by weight of multi-ethylenic monomeric units, about 5% by weight to about 40% by weight of mono-allylic monomeric units, and about 50% by weight to about 95% by weight of mono-ethylenic monomeric units. The copolymer has a weight average molecular weight greater than about 10,000, a molecular weight distribution (Mw/Mn) greater than about 5, and a gel content less than about 10% by weight.

The following examples merely illustrate the invention. Those skilled in the art will recognize many variations that are within the spirit of the invention and scope of the claims.

EXAMPLE 1

A 2-liter glass reactor equipped with an agitator, a heater, a monomer addition funnel, a condenser, and a nitrogen inlet, is charged with allyl monopropoxylate (100 g, product of Lyondell Chemical Company). The reactor contents are purged with nitrogen for 30 minutes. Styrene (640 g), n-butyl methacrylate (160 g), divinylbenzene (6.0 g, 80%, product of Aldrich) and di-tert-butyl peroxide (50 g) are mixed and charged into the addition funnel. The reactor is initially charged with 101 grams of the mixture, and is heated to 145° C. The remaining mixture is added into the reactor over 6 hours as follows: first hour, 195 g; second hour, 165 g; third hour, 135 g; fourth hour, 110 g; fifth hour, 85 g; and sixth hour, 65 g. The reaction is allowed to continue for an additional 30 minutes at 145° C. after the addition. The unreacted monomer is removed by vacuum distillation at 155° C. with nitrogen purging. The product (835 g) is collected (87.3% yield). The resulting copolymer is colorless and has good clarity. GPC shows two main peaks at $10^4$ and $10^6$. The product has Mn: 6600, Mw: 126,200, glass transition temperature ($T_g$, by DSC): 63° C., and toluene insoluble portion: 1% by weight.

EXAMPLE 2

A reactor as described in Example 1, is charged with allyl monopropoxylate (100 g). The reactor contents are purged with nitrogen for 30 minutes. Styrene (429 g), n-butyl methacrylate (107 g), divinylbenzene (3.35 g, 80%), and di-tert-butyl peroxide (33.5 g) are mixed and charged into the addition funnel. The reactor is initially charged with 100 grams of the mixture, and is heated to 145° C. The remaining mixture is added into reactor over 4 hours as follows: first hour, 171 g; second hour, 144 g; third hour, 90 g; fourth hour, 67.5 g. The reaction is allowed to continue for an additional 30 minutes at 145° C. after the addition. The unreacted monomer is removed by vacuum distillation at 155° C. with nitrogen purging. The product (563 g) is collected (83.7% yield). The resulting resin is colorless and has good clarity. GPC shows only one main molecular weight peak at $10^4$, and it has Mn: 5820 and Mw: 52,350, $T_g$: 65° C., and toluene insoluble portion: 0%.

COMPARATIVE EXAMPLE 3

A reactor as described in Example 1 is charged with styrene (640 g), n-butyl methacrylate (160 g), divinylbenzene (6.0 g, 80%), and di-tert-butyl peroxide (50 g). The reactor contents are purged with nitrogen for 30 minutes, and are then heated to 145° C. The reaction contents gel completely within 30 min.

I claim:

1. An allylic copolymer that comprises
   (a) about 0.1% by weight to about 10% by weight of a multi-ethylenic monomeric units;
   (b) about 5% by weight to about 40% by weight of a mono-allylic monomeric units; wherein the mono-allylic monomer is selected from the group consisting of allyl and methallyl alcohols, ethoxylated allyl and methallyl alcohols of 1 to 5 oxyethylene units, and propoxylated allyl and methallyl alcohols of 1 to 5 oxypropylene units; and
   (c) about 50% by weight to about 95% by weight of a mono-ethylenic monomeric units;
   said polymer has a weight average molecular weight greater than about 10,000, a molecular weight distribution (Mw/Mn) greater than about 5, and a gel content less than about 10% by weight.

2. A toner composition comprising the copolymer of claim 1.

3. The copolymer of claim 1 wherein the mono-ethylenic monomer is selected from the group consisting of vinyl aromatics, $C_1$ to $C_{20}$ alkyl and $C_6$ to $C_{20}$ aryl acrylates and methacrylates, vinyl halides, vinyl ethers, vinyl esters, acrylic and methacrylic acids, conjugated dienes, and mixtures thereof.

4. The copolymer of claim 1 wherein the mono-ethylenic monomer is a mixture of styrene and butadiene.

5. The copolymer of claim 1 wherein the mono-ethylenic monomer is a mixture of styrene and methyl methacrylate.

6. The copolymer of claim 1 wherein the multi-ethylenic monomer is selected from the group consisting of divinyl aromatics, diacrylates, dimethacrylates, and mixtures thereof.

7. The copolymer of claim 1 wherein the multi-ethylenic monomer is divinyl benzene.

8. The copolymer of claim 1 wherein the mono-allylic monomer is an ethoxylated allyl or methallyl alcohol of 1 to 5 oxyethylene units.

9. The copolymer of claim 1 wherein the mono-allylic monomer is allyl alcohol monopropoxylate.

* * * * *